Dec. 30, 1952  W. C. SIBBLE  2,623,734
POWER-OPERATED PIPE WRENCH
Filed April 15, 1947  3 Sheets-Sheet 1

INVENTOR.
Walter C. Sibble
BY
Gascort Downing & Seebold
Attorneys.

Dec. 30, 1952     W. C. SIBBLE     2,623,734
POWER-OPERATED PIPE WRENCH
Filed April 15, 1947     3 Sheets-Sheet 2
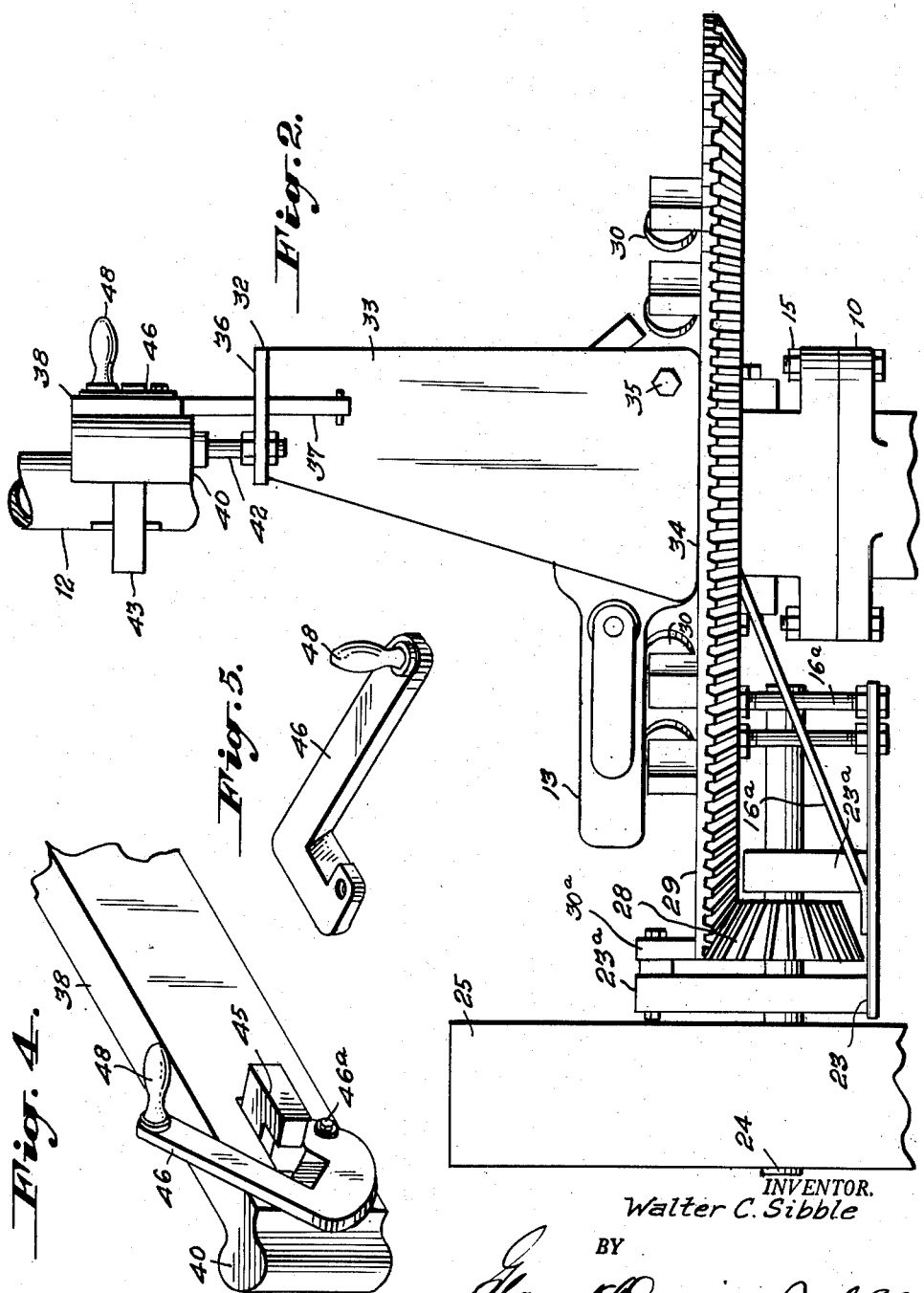
INVENTOR.
Walter C. Sibble
BY
*Attorneys.*

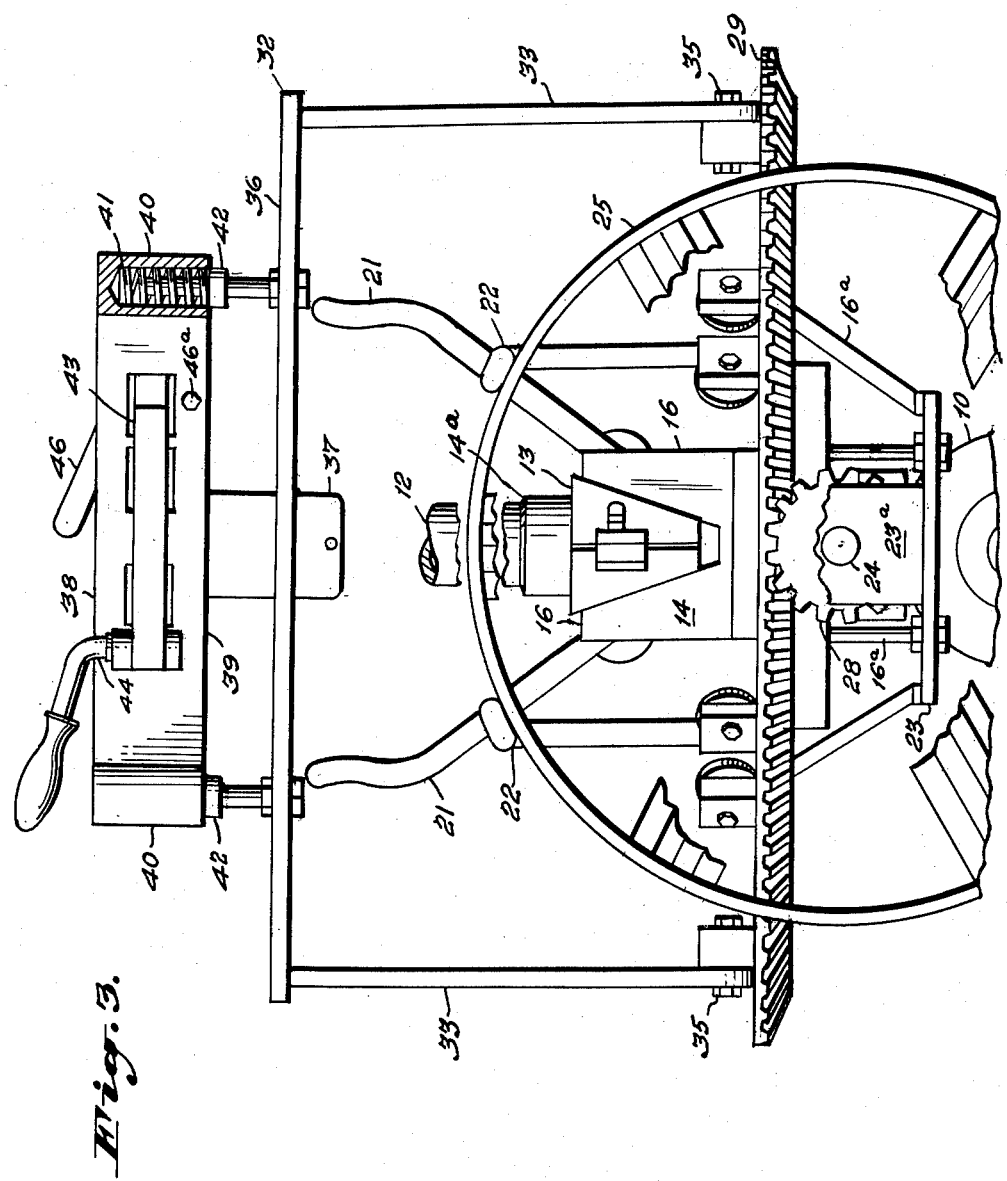

Patented Dec. 30, 1952

2,623,734

UNITED STATES PATENT OFFICE 2,623,734

POWER-OPERATED PIPE WRENCH

Walter C. Sibble, Wellsville, N. Y.

Application April 15, 1947, Serial No. 741,441

5 Claims. (Cl. 255—35)

This invention relates to oil well equipment and has for its object the provision of a power driven device for facilitating the turning of the sections of oil well pipes or the plunger operating rods passing through such pipes to enable the pipe or rod sections to be coupled or uncoupled incident to the introduction of the pipes or rods into or their removal from the well, section by section.

A further object of the invention is the provision of a device of this character embodying structural features which simplify and expedite the coupling and uncoupling operations to such extent that they can be successfully carried out by one attendant.

Fig. 2 is a side elevation view of the same; and

Fig. 3 is a front elevation view of same,

Fig. 4 is an enlarged perspective detail of the latch cam of the pipe gripping and turning assembly, and Fig. 5 is a perspective view of the latch cam per se.

Figure 1:
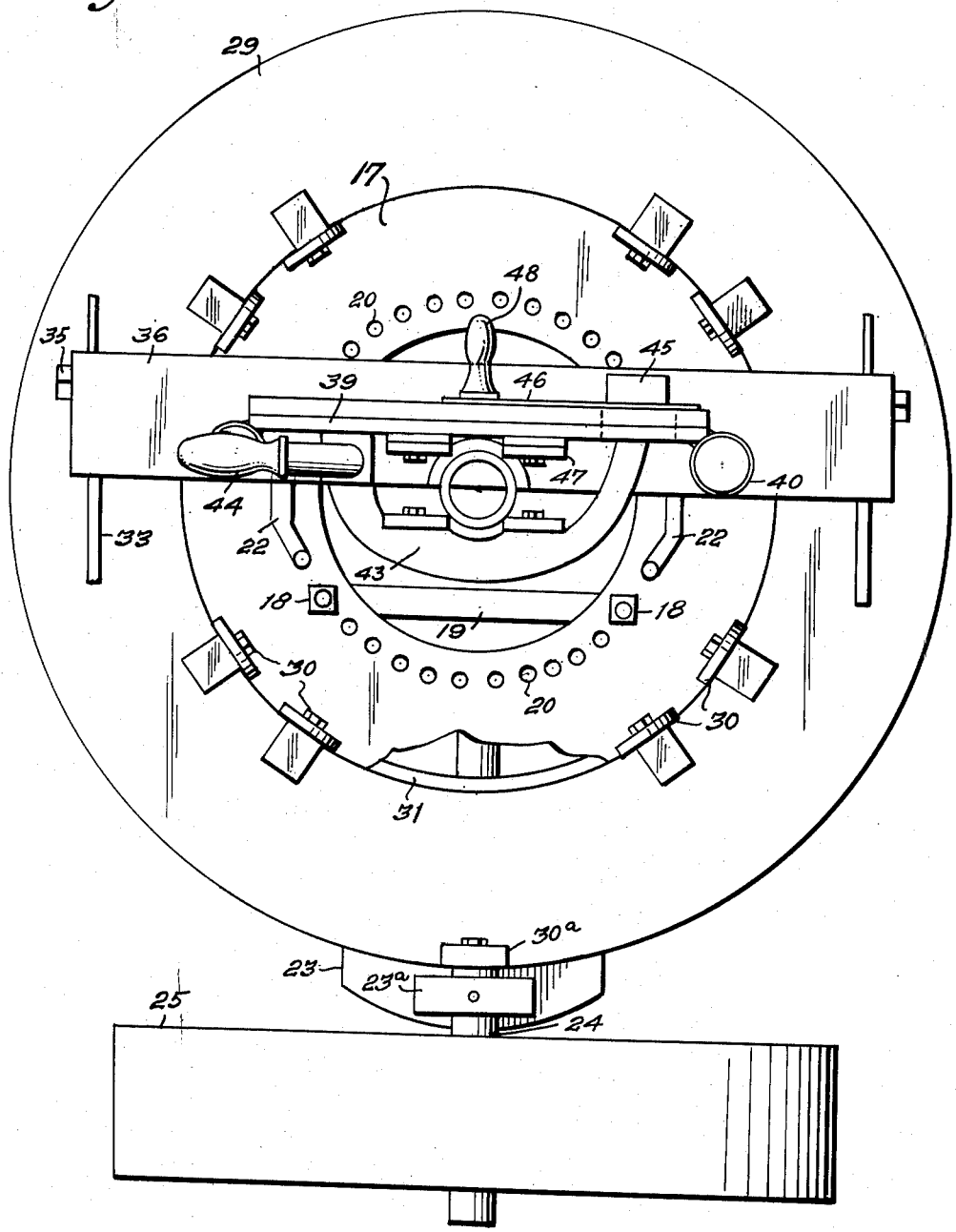
Fig. 1 is a top plan view of the power operated pipe wrench according to the present invention.

Referring to the drawing in detail the numeral 10 indicates the head applied to the casing of an oil well through which extends the tube or pipe 12 composed of sections connected by threaded coupling sleeves 14a. A pipe clamping and hoisting device 13 and a coupling cradle 14 both preferably constructed in accordance with my prior Patent No. 2,288,977 dated July 7, 1942, are employed in carrying out the present invention, the cradle being secured by means of bolts 15 to the head 10 and the hinged parts of the clamping device being engageable between the upwardly diverging members 16 of the cradle, whereby the gripping members of the clamping device are caused to clamp and hold the coupling sleeve 14a against both rotary and downward movement.

The present invention for use in either joining or separating sections of the pipe 12 or the plunger operating rod (not shown) is composed of a supporting plate 17 secured by bolts 18 to lateral projections 19 formed integrally with the cradle 14. For convenience in adjusting the position of the plate 17 angularly with respect to the head 10 in dependence upon the location of the motor to be used to drive the pipe turning mechanism the plate 17 is formed with a plurality of apertures 20 through which the securing bolts 18 are engageable. The pipe clamping and hoisting device 13 is provided with pivoted bails 21 as disclosed in my above mentioned patent for use in hoisting and lowering the pipe and for holding such bails in position during pipe turning operations the supporting plate 17 is formed with bail holders 22. The supporting plate 17 is provided with attaching members 16a securing a radial projection 23 to which are secured bearings 23a rotatably supporting a drive shaft 24 provided at its outer extremity with a pulley 25 operated from a reversible motor not shown through a belt or other power transmission device (not shown). The shaft 24 is secured to a bevel pinion 28 meshing with the teeth formed on the under side of a ring gear 29 whereby the rotary motion of the shaft 24 is transmitted to said ring gear.

The ring gear surrounds the circular supporting plate 17 and to reduce the frictional resistance to its rotary motion during pipe coupling and uncoupling operations, rollers 30 and 30a are secured to the ring gear and to one of the bearings 23a, respectively, in such position as to roll upon the upper surface of the supporting plate 17 and the ring gear or second plate member 29. The under side of the ring gear is formed with detachable arcuate plates 31 constituting flange means projecting inwardly below the supporting plate 17 to prevent the ring gear and the parts supported and operated thereby from assuming tilted positions.

An inverted U-shaped turning frame 32 is provided with relatively wide side or leg members 33 having square ends 34 resting upon the top face of the ring gear 29 when the turning frame is in an upright operative position. At one corner of each side member 33 the frame 32 is pivotally connected at 35 with the ring gear so that the frame may be tilted from the operative vertical position to an inclined position affording greater freedom or access to the pipe 12.

The horizontal web portion or cross member 36 of the turning frame 32 is formed with a slot slidably receiving a shank 37 depending from the pipe gripping and turning assembly 38. The body member 39 of the gripping assembly 38 is formed at its opposite ends with vertical cylinders 40 closed at their upper ends and removably receiving springs 41 secured at their lower extremities adjacent the lower ends of posts 42 rigidly secured to the web portion 36 of the turning frame 32. The tension of the springs 41 is sufficient to yieldably support the pipe gripping assembly 38 in spaced relation above the web portion 36 and the spring afford the freedom of movement of the gripping assembly such as required as the pipe is screwed into or removed from an adjacent section.

A clamping member 43 is pivotally connected to the body member 39 by a hinge pin 44 preferably provided with an angular extremity for convenience in manipulating the clamping member. The opposite end of the clamping member is directed angularly as at 45 and after being passed through an aperture in the body 39 is engaged and operated by a latch cam 46 in such manner as to forcibly grip the pipe located between the gripping members 47 provided on the body member 39 and similar gripping members formed on the clamping member 43. A handle 48 is provided on the latch cam 46 for convenience in operating the cam about its pivot 46a.

In the operation of removing pipe sections from the oil well, a section thereof is hoisted in the usual manner by available hoisting machinery and the hoisted section is maintained in elevated position by applying the hinged parts of the clamping device 13 to one of the coupling sleeves 14a whereupon the pipe and clamping device 13 are secured against both axial and rotary movement by engaging said clamping device between the members 16 of the cradle 14. During these operations the turning frame 32 is swung back about the pivot connections 35 after the disengagement of the clamping member 43 so as to afford free access to the pipe. Thereafter the frame 32 is swung into upright operative position and the pipe is securely connected therewith by swinging clamping member 43 into operative position and manipulating the latch cam 46 in order to retain the member 43 in effective position. The motor or other drive means not shown is set in operation thereby rotating the ring gear 29, the movement thereof being transmitted to the pipe section 12 through the frame 32 and pipe gripping assembly 38. During the turning movement of the uppermost pipe section the next lower coupling sleeve 14a is held stationary by the clamping device 13 engaged in the cradle 14 and incident to the axial movement of the uppermost pipe section resulting from the effects of the screw thread, the gripping assembly 38 is permitted to move upwardly the required distance owing to the yieldable connection between the body member 39 and the posts 42 afforded by the springs 41. As each pipe section is uncoupled from the coupling sleeve 14a of the next adjacent pipe section, the entire pipe line is raised and the operations repeated. When introducing the pipe sections into the well the foregoing operations are performed in reverse order and the motor or drive means is operated in the opposite direction so that a pipe section occupying a raised position above the well may be conveniently coupled with the next adjacent section thereunder and after lowering the entire pipe line the operations are repeated.

What I claim is:

1. In a power operated pipe wrench for joining or separating well pipe sections and the like a cradle, means for mounting the cradle on the casing head of a well, clamping means embodied with the cradle for gripping a first pipe section and holding the same against rotary and longitudinal movement, an apertured circular supporting plate secured to said cradle, a second apertured circular plate concentric of and having its upper surface coplanar with the upper surface of said first plate, gear teeth on the under surface of said second plate whereby said second plate constitutes a ring gear, spaced aligned shaft bearing supported by and beneath said first plate, one of said bearings being outward of the periphery of said second plate, flange means embodied with said second plate and projecting inwardly of the aperture therein beneath the outer edge of said first plate, a series of circularly arranged rollers mounted on said second plate with their axes horizontal and bearing on the upper surface of said first plate, another roller mounted on said one bearing and rotatably contacting the upper surface of said second plate, said flange means and said rollers providing a mounting permitting said second plate to freely rotate relative to and in the same plane as said first plate, a reversible driving shaft disposed in said bearings, a gear thereon in mesh with said teeth on said second plate, an inverted U-shaped frame including spaced legs and a horizontal cross member, pivot means connecting the legs of said frame to said second plate for movement about an axis transverse to the axes of the apertures in the plates, said legs having squared lower ends for bearing against the upper surface of said second plate when the frame is in a vertical position, and a second clamping means carried by said cross member for clamping another pipe section and including means permitting vertical movement of the clamping means relative to the cross member, whereby rotation of said shaft turns said second plate and said second clamping means carried thereby to couple or uncouple pipe sections depending upon the direction of rotation.

2. In a power operated pipe wrench as defined in and by claim 1, and said first plate being angularly adjustably secured to said cradle whereby said first plate and the driving shaft can be angularly displaced depending upon the physical location and disposition of the power means to be connected with said shaft.

3. In a power operated pipe wrench as defined in and by claim 1, and said cross member having a slot therein, said second clamping means including a depending bar slidably engaged within said slot, a cross piece on said bar, fixed clamping jaws carried by said cross piece, a movable clamping jaw pivotally mounted about an axis parallel with said bar and including an arcuate leg terminating in an angular offset end, said cross piece having a slot therein through which passes said angular offset end when the movable jaw is in pipe clamping position and a pivoted latch carried by the cross piece cooperating with said offset end to lock the movable jaw in clamping position.

4. In a power operated pipe wrench as defined in and by claim 3, and in which said cross piece is provided with cylinders at opposite ends thereof, said cylinders having their axes parallel with the axes of said depending bar and closed at their upper ends, and the cross member of said frame having posts projecting upwardly therefrom and springs secured to said posts in alignment with the axes of said cylinders and maintaining said clamping means above said cross member but constituting the means permitting relative movement of said clamping means relative to said cross member.

5. In a power operated pipe wrench for separating and joining sections of well tubing adjacent the casing head of a well, a cradle supported by the casing head and having pipe clamping and lifting tongs embodied therewith, a supporting plate angularly adjustably fixed to said cradle, a ring gear rotatably mounted relative to said plate and having anti-friction rollers on the upper surface thereof contacting said plate and at least partially supporting said gear on said plate, drive means for rotating said ring gear supported by said plate and a second pipe clamping means including an inverted U frame pivotally supported on said ring gear for movement about an axis transverse to the axis of the tubing, whereby said frame can be swung away from said tubing to permit raising and lowering thereof and can be swung to an operative vertical position to place the clamping means embodied therewith in alignment with said clamping and lifting tongs.

WALTER C. SIBBLE.

REFERENCES CITED

The following references are of record in the file of this patent:

UNITED STATES PATENTS

| Number | Name | Date |
|---|---|---|
| 1,079,396 | Chapman | Nov. 25, 1913 |
| 1,280,850 | Robichaux et al. | Oct. 8, 1918 |
| 1,306,908 | Taylor | Aug. 9, 1921 |
| 1,455,999 | Fetzer | May 22, 1923 |
| 1,506,583 | Hoffman | Aug. 26, 1924 |
| 1,514,195 | Brandon | Nov. 4, 1924 |
| 2,000,221 | Dawson | May 7, 1935 |
| 2,288,977 | Sibble | July 7, 1942 |
| 2,295,720 | Dietzmann et al. | Sept. 15, 1942 |